United States Patent [19]

Rowland et al.

[11] Patent Number: 4,776,560

[45] Date of Patent: Oct. 11, 1988

[54] FUEL FLOW CONTROL VALVE

[75] Inventors: Peter J. Rowland; Neville F. Adams, both of Yeovil; Ronald E. Short, Beaminster, all of England

[73] Assignee: Westland plc, Yeovil, England

[21] Appl. No.: 920,610

[22] Filed: Oct. 20, 1986

[30] Foreign Application Priority Data

Nov. 4, 1985 [GB] United Kingdom ............... 8527146

[51] Int. Cl.$^4$ ............................................. F16K 31/12
[52] U.S. Cl. .................................. 251/31; 60/39.141; 60/39.281
[58] Field of Search ............... 251/31, 60, 61.5, 63.6, 251/122, 337, 903; 60/39.141, 39.281

[56] References Cited

U.S. PATENT DOCUMENTS

| | | | |
|---|---|---|---|
| 1,747,598 | 2/1930 | Popp | 251/903 |
| 2,665,711 | 1/1954 | Parks | 251/61.5 |
| 2,697,599 | 12/1954 | Vandal | 251/337 |
| 3,155,365 | 11/1964 | Hartung et al. | 251/31 |
| 3,451,423 | 6/1969 | Priese | 251/31 |
| 3,517,688 | 6/1970 | Scholle | 251/63.6 |
| 3,580,435 | 5/1971 | Bertilsson | 251/31 |
| 3,902,696 | 9/1975 | Ito et al. | 251/61.5 |

Primary Examiner—Louis J. Casaregola

[57] ABSTRACT

A fuel flow control valve is adapted to control the flow of fuel in a spill line to control the amount of fuel usable in a two speed gas turbine. The valve includes fluid pressure operated valve means controlled by two variable volume fluid pressure chambers to provide appropriate fuel flow for 'run' and 'idle' conditions, and positioning means to automatically position the fluid pressure operated valve means when the control valve is at rest to provide a flow of fuel appropriate for 'start-up' of the gas turbine that is greater than the flow required in the 'idle' condition but less than that required in the 'run' condition. Operating fluid pressures connected to the chambers may comprise either gaseous fluid pressures tapped from a stage of the compressor of the gas turbine or a combination of said gaseous pressure source and a liquid fluid pressure source preferably comprising a fuel pressure supply tapped from the fuel supply line to the gas turbine.

8 Claims, 2 Drawing Sheets

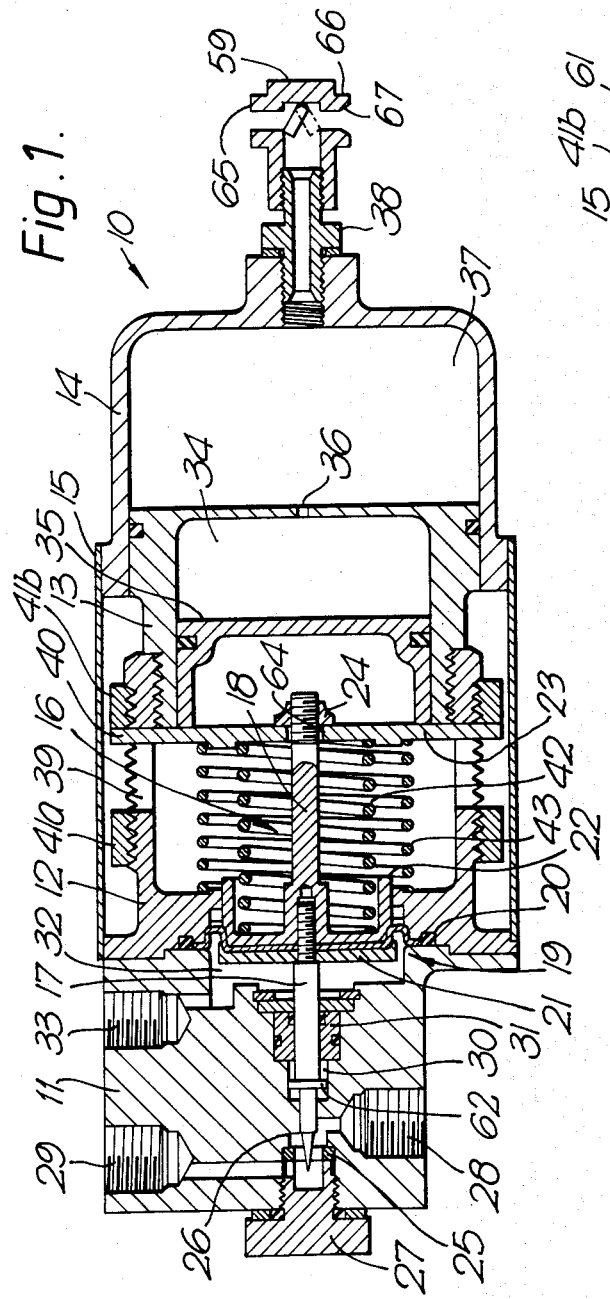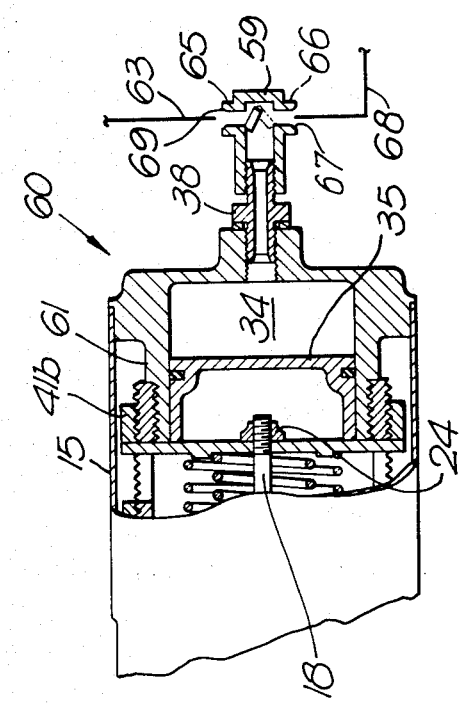

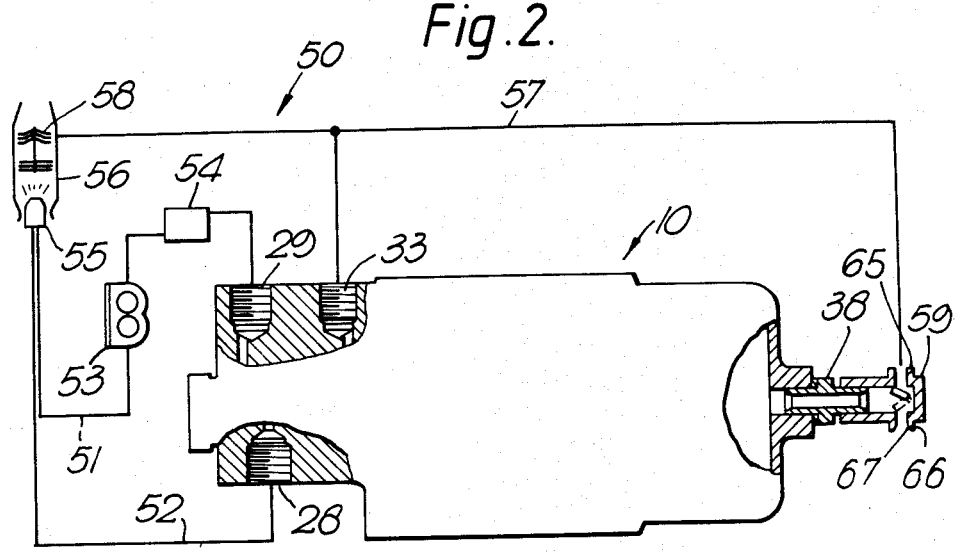
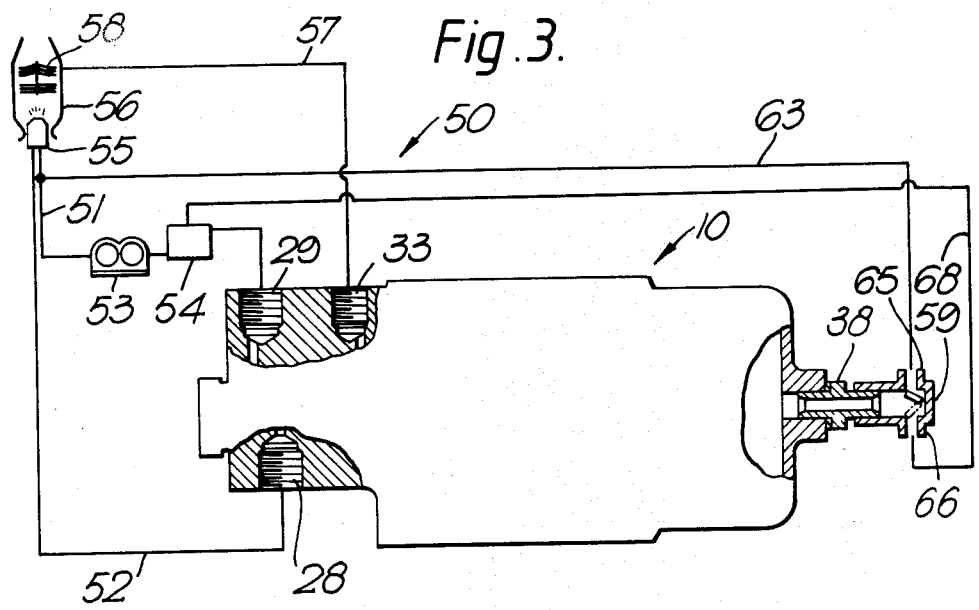

FUEL FLOW CONTROL VALVE

This invention relates to fuel flow control valves and fuel control systems incorporating same and particularly to such valves and control systems for control of fuel flow to a two-speed gas turbine.

Two-speed gas turbines as contemplated herein are generally small and uncomplicated and required to operate at, substantially, a predetermined idling speed or a predetermined running speed, with regulated acceleration and deceleration in changing from the one speed to the other.

The rate of acceleration and that of deceleration can be required to be at different rates inasmuch as the rate of acceleration may be limited by surge and overspeed threshold whereas the rate of deceleration may be limited only to that above which flame-out might occur.

Accordingly, in one aspect this invention provides a fuel flow control valve for controlling the flow of fuel to a two-speed gas turbine and includes fluid pressure operated valve means for controlling automatically the flow of fuel in 'idle' and 'run' conditions and when the control valve is at rest automatically provides for a flow of fuel appropriate for 'start-up' of the gas turbine that is greater than the flow required in the 'idle' condition but less than that required in the 'run' condition.

The control valve may include first and second variable volume fluid pressure chambers for controlling the position of the fluid pressure operated valve means in said 'idle' and 'run' conditions and positioning means for automatically positioning the fluid pressure operated valve means to provide said 'start-up' fuel flow.

The fluid pressure operated valve means may comprise a valve head carried by an axially movable spindle and co-operable during operation with a valve seat to control the flow in a fuel flow passage, a first pressure responsive member attached to the spindle and forming a movable wall of said first fluid pressure chamber, a second pressure responsive member forming a movable wall of said second fluid pressure chamber, a flow restrictor to regulate fluid communication with said second fluid pressure chamber, and selector valve means selectively operable during operation to connect said second chamber to a supply of pressurised fluid or to a vent connection, adjustable stop means for limiting axial movement of said second pressure responsive member, and spring means between facing surfaces of said first and second pressure responsive members acting to urge said members axially apart, wherein said positioning means is adapted to hold the valve head off the valve seat by a predetermined amount to provide said 'start-up' fuel flow.

The first pressure responsive member may comprise a diaphragm assembly and said second pressure responsive member may comprise a spring plate operatively associated with a piston.

Said adjustable positioning means preferably comprises a threaded end of said spindle protruding through an aperture in said spring plate and an adjuster nut on the protruding end retained in contact with the surface of the spring plate under the influence of the spring when the valve is at rest.

Conveniently said adjustable stop means comprises at least two diametrically opposed fingers on the spring plate located in axial slots in a body portion and an adjustable threaded ring on the body at both sides of the plate to limit axial movement of the plate during operation.

A third fluid pressure chamber may be located between said selector valve means and said second fluid pressure chamber and in such an arrangement, said flow restrictor may be located between said second and third chambers.

The valve head may comprise a needle valve.

In another aspect the invention provides a fuel flow control system for a two-speed gas turbine including a fuel tank, a pump for delivering fuel through a fuel delivery line to the gas turbine at a constant pressure, a fuel return line for returning a proportion of the fuel to the tank and a fuel flow control valve for controlling the flow of fuel in the fuel return line thereby controlling the fuel flow to the gas turbine, wherein the fuel flow control valve includes fluid pressure operated valve means for automatically providing the required fuel flow to operate the gas turbine in a selected one of 'idle' and 'run' conditions and when at rest is automatically positioned to provide for the required fuel flow for 'start-up' of the gas turbine that is greater than that required in the 'idle' condition but less than that required in the 'run' condition.

The control valve 10 may include first and second variable volume fluid pressure chambers connected to fluid pressure supplies so that changes in the respective chamber volumes control the position of the fluid pressure operated valve means in said 'idle' and 'run' conditions, and positioning means for automatically positioning the fluid pressure operated valve means to provide said 'start-up' fuel flow when no fluid pressure is being supplied to said chambers.

The fluid pressure operated valve means may include a valve head carried by an axially movable spindle for co-operation with a valve seat for controlling the flow of fuel in the fuel return line, a first pressure responsive member secured to the spindle and defining a movable wall of said first fluid pressure chamber connected to a first fluid pressure supply, a second pressure responsive member defining a movable wall of said second fluid pressure chamber connected to a second fluid pressure supply through a flow restrictor, selector valve means to selectively connect said second chamber to said supply or to a vent, spring means between internal facing surfaces of said first and second pressure responsive members acting to urge said members axially apart, and adjustable stop means for limiting axial movement of said second pressure responsive member, said positioning means being adapted to hold the valve head off the valve seat by a pre-determined amount to provide said 'start-up' fuel flow.

Preferably said positioning means includes a threaded end of said spindle protruding through said second pressure responsive means, and an adjuster nut threaded on the spindle and retained in contact with an external surface of said second pressure responsive means by said spring means.

In one form of the invention said first and second fluid pressure supplies comprise gaseous fluid pressure supplies tapped from the compressor stage of the gas turbine. In such an arrangement a third fluid pressure chamber may be interposed between the selector valve means and the second fluid pressure chamber, and a second flow restrictor may be located in the vent outlet connection from the selector valve means.

In an alternative form of the invention the first fluid pressure supply comprises a gaseous fluid pressure supply tapped from the compressor stage of the gas turbine and the second fluid pressure supply comprises a liquid fluid pressure supply tapped from the inlet fuel supply to the gas turbine. Conveniently, said flow restrictor may be located in the inlet connection of the selector valve means and a second flow restrictor may be located in the vent outlet connection of said selector valve means.

The invention will now be described by way of example only and with reference to the accompanying drawings in which:

FIG. 1 is a sectional view of a fuel flow control valve constructed in accordance with the invention;

FIG. 2 illustrates schematically a fuel flow control system according to the invention and incorporating the valve shown in FIG. 1;

FIG. 3 illustrates schematically a modified fuel flow control system and incorporating a modified version of the fuel flow control valve of FIG. 1; and FIG. 4 is a fragmentary sectional view of a modification of the valve of FIG. 3.

A fuel flow control valve 10 is of a generally circular elongate form comprising an axial arrangement of body components in sealed attachment one to the other and including a valve block 11, first and second body portions 12, 13, respectively, and an end cap 14 which provides a shroud 15 enclosing the two body portions.

The valve includes fluid pressure operated valve means comprising a spindle assembly 16, lying along the longitudinal axis of the valve 10, and including a valve head in the form of a needle valve 17 which is threaded axially into one end of a spindle 18. Trapped between adjacent shoulders of the needle valve and the spindle is a diaphragm assembly 19 comprising a rolling diaphragm 20 and two circular backing plates 21, 22, one of which backing plates 22 is flanged and freely locates within a short bore of the first body portion 12. A threaded end of spindle 18 remote from the diaphragm assembly 19 passes freely through a central hole 64 in a spring plate 23 and is fitted with an adjuster nut 24 which, with the valve at rest, is held against the surface of the spring plate 23 by a spring 42 positioned about the spindle 18 and compressed between facing surfaces of the spring plate 23 and the flanged backing plate 22 of the diaphragm assembly 19. The needle valve 17 extends into the valve block 11 and co-operates with a valve seat therein which is provided by an orifice plate 25.

The valve block 11 provides a fuel flow passage therethrough including a stepped bore 26 into which the needle valve 17 projects and is coaxial therewith. The orifice plate 25 is held in place against the step by a threaded plug 27 which is suitably ported to allow the passage of fuel across it from an inlet 28 to an outlet 29 which intersect the stepped bore 26, one to each side of the orifice plate 25. A portion of the stepped bore 26 remote from the plug 27 provides a dash-pot 30 in which a flange 62 on the needle valve 17 acts. Clearance around the needle valve enables fluid to enter the dash-pot 30 from the inlet 28 whilst a sealing member 31, which prevents fuel leakage from the valve block 11 is retained by a circlip. The enclosed face of the valve block is so shaped as to provide a first or control variable volume pressure chamber 32 of which the diaphragm assembly 19 forms a movable wall, and which is entered by an inlet 33 in valve block 11.

The second body portion 13, which is screw threaded to the first body portion 12, provides a second or regulating variable volume pressure chamber 34 in which a free piston 35 is located for contact with a surface of the spring plate 23 to form in combination a movable wall of the regulating pressure chamber. An orifice 36 connects the interior of the regulating pressure chamber 34 with a volumetric capacity 37 provided in end cap 14 which provides external fluid connection by way of a connector 38 and a solenoid controlled selector valve 59 having an inlet connection 65 and an outlet connection 66, the latter being provided with a restrictor orifice 67.

The first body portion 12 is provided with two diametrically aligned axial slots 39 into which two diametral fingers 40 of the spring plate 23 project. The outside of the first body portion 12 is suitably threaded and carries two associating threaded rings 41a, 41b, one at each side of the spring plate 23 to limit axial movements of the plate 23. An anti-rattle compression spring 43 is fitted concentrically of the spring 42 and is constrained between the first body portion 12 and the spring plate 23.

The compression spring 42 is designed to provide a predetermined load, at a given working length, and a rate that is suitable for the working pressure range of a fuel control system in which the valve 10 is to operate; whilst the orifice 36, capacity 37 and the orifice 67 are calculated to provide desired rates of acceleration and deceleration of a gas turbine that in operation is to be controlled by the valve 10. Upon initial assembly of the valve 10, the operating pre-loadings of the spring 42 which approximate to desired 'idle' or 'run' conditions of the turbine are provided when the fingers 40 of the spring plate 23 abut one or other end of the axial slots 39 in the first body portion 12. Adjustment of the threaded ring 41a sets the pre-loading of spring 42 to obtain the 'run' condition whilst adjustment of the companion ring 41b sets the pre-loading of spring 42 appropriate for the 'idle' condition. The desired position of the needle valve 17 for providing the 'start-up' condition is established automatically with the valve at rest, i.e. with no pressure in control pressure chamber 32 or regulating chamber 34, and with spring plate 23 held against stop 41b by anti-rattle spring 43. The positioning means comprises the contact between the adjuster nut 24 and the surface of the spring plate 23 under the influence of spring 42 which retains the needle valve 17 off its seat in orifice plate 25 by a desired amount so as to allow a fuel flow to be supplied momentarily during 'start-up' that is less than the maximum required in the 'run' condition but greater than the maximum required in the 'idle' condition.

FIG. 2 illustrates a fuel flow control system 50 for a gas turbine incorporating the control valve 10 of FIG. 1. In the system of FIG. 2, the control valve 10 utilises a gas pressure source to vary the volume of chambers 32 and 34 to operate the fluid pressure operated valve means so as to control fuel flow to the turbine. The outlet of a fuel pump 53 is connected by a fuel delivery line 51 to a fuel atomiser or spray nozzle 55 of a gas turbine 56. The nozzle 55 is also connected by way of fuel return line 52 to the inlet port 28 of valve 10 and the outlet port 29 of valve 10 is connected via a fuel tank 54 to the inlet of fuel pump 53. The operating gas pressure is tapped from a stage of the compressor 58 of the gas turbine 56 and is supplied to the fuel flow control valve 10 through pressure sensing line 57 having two branches, of which one branch communicates with the control pressure chamber 32 by way of the unrestricted inlet connection 33 and the other branch communicates with the regulating pressure chamber 34 by way of the selector valve 59, connector 38, volumetric capacity 37 and orifice 36. The outlet connection 66 of selector valve 59 is vented to atmosphere.

In operation of the system of FIG. 2, fuel is pumped to the atomiser or spray nozzle 55 at a constant pressure and some or all of the fuel is used depending on the desired output of the gas turbine 56. When less than all the delivered fuel is required to be sprayed into the combustion chamber of the turbine the control valve 10 ensures that the remainder is fed back to the tank by way of the fuel return or spill line 52 and the fuel control valve itself. Thus, the fuel control valve 10 regulates the amount of fuel sprayed from nozzle 55 by controlling the proportion of fuel returning to the tank 54.

When the control valve 10 of the system 50 is at rest, i.e. with no pressurised gas being supplied to chambers 32 and 34, the spindle assembly 16, diaphragm assembly 19, and spring backing plate 23 are positioned by the anti-rattle spring 43 so that the spring plate 23 abuts the stop 41b. The position of the adjuster nut 24 as it reacts the compression spring 42 against the diaphragm assembly 19 determines that the needle valve 17 is set appropriately for 'start-up'. If, as is normally the case, the turbine 56 is to go to the 'idle' condition following start-up, the solenoid controlled selector valve 59 is energised to connect the pressure regulating chamber 34 with the vent to atmosphere through outlet connection 66 and orifice 67.

Once the turbine has started pressure will commence to build up immediately in control pressure chamber 32 causing the diaphragm assembly 19 to move the spindle assembly 16 in the direction compressing the spring 42. This movement is permitted by sliding of the spindle 18 through the aperture 64 in spring plate 23, moving the adjuster nut 24 away from the surface of the spring plate 23, and continues until pressure in the control pressure chamber 32 and the load exerted by the spring 42 hold the diaphragm assembly 19 in a state of balance. The corresponding axial movement of the spindle assembly 16 withdraws the needle valve 17 from the orifice plate 25 to automatically reduce the flow of fuel to the gas turbine from the level required for 'start-up' to that required for 'idle'.

When it is desired to go to the 'run' condition the selector valve 59 is actuated to connect the pressure regulating chamber 34 with the sensing line 57, which causes pressure to build slowly in the regulating pressure chamber 34, owing to the restriction imposed by the flow restricting orifice 36. As the fluid pressure continues to build in the regulating pressure chamber 34 at a regulated rate because of the restriction caused by orifice 36, it becomes effective upon the piston 35 which because of its larger effective surface area than the diaphragm 20 of diaphragm assembly 19, moves the spring plate 23 towards stop 41a. This compresses the spring 42 against the diaphragm assembly 19 to counter the pressure exerted there-against in the control pressure chamber 32, causing the needle valve 17 to be moved towards re-entering further into the orifice plate 25 so that the fuel flow through the valve reduces until the spindle assembly 16 and the diaphragm 20 are held in balance, whereby the fuel flow to the atomiser or spray nozzle 55 increases correspondingly and at a controlled acceleration rate to a point at which the turbine 56 is maintained in the 'run' condition.

If the solenoid controlled selector valve 59 is then de-energised, to obtain the 'idle' condition, the regulating pressure chamber 34 and the volumetric capacity 37 are switched from being connected to the pressure sensing line 57 to being connected to ambient atmosphere by way of the two flow restrictions provided by the orifices 36 and 67. The result of the pressure in the regulating pressure chamber 34 having to pass through two serially arranged orifices is that the initial difference in pressure across the orifice 36 is substantially nil whilst the difference in pressure across the orifice 67 is relatively large. Consequently the rate at which the pressure reduces in the regulating pressure chamber 34 is such that it commences slowly but increasingly so that the spring plate 23 moves accordingly towards stop 41b to draw the needle valve 17 towards further opening the orifice plate 25 whereby the fuel flow through the fuel flow control valve 10 increases slowly with a corresponding reduction in the rate of fuel flowing to the atomiser or spray nozzle 55.

It will be apparent that such constraining of initial movement of the spindle assembly 16 during deceleration of the gas turbine prevents flame-out at the atomiser or spray nozzle 55, as could occur with a rapid initial reduction in fuel flow thereto.

When the spring plate 23 contacts stop 41b the pressure in control pressure chamber 32 continues to move the spindle assembly 16 axially to withdraw the needle valve 17 from the orifice plate 25. As previously explained this movement is permitted by sliding of the spindle 18 through the aperture 64 in spring plate 23 moving the adjuster nut 24 away from the surface of the spring plate 23, and continues until the pressure in the control pressure chamber 32 and the load exerted by the spring 42 hold the diaphragm assembly 19 in a state of balance to provide a fuel flow appropriate for the 'idle' condition of the gas turbine 56.

FIG. 3 in which like reference numerals are used to indicate parts similar to those previously described, illustrates a modified fuel control system utilising two separate fluid pressure control sources for operation of the control valve 10. One of the sources is again a gas pressure source and the other is a liquid fluid pressure consisting of fuel pressure tapped from the fuel delivery line 51.

In the embodiment of FIG. 3 the characteristics of spring 42 and dimensions of orifice 36 are selected to accommodate respectively the change in pressure and the change in density in using fuel as one pressure reference source. Gas pressure sensing line 57 again connects to port 33 but in this embodiment the inlet connection 65 of selector valve 59 is connected to a source of fuel pressure by way of pressure sensing line 63 tapped into fuel delivery line 51. The outlet connection 66 of selector valve 59 is unrestricted and connected through vent line 68 to tank 54.

Operation of the modified fuel flow control system of FIG. 3 is similar to that previously described except that because of the higher density and lower compressibility of fuel relative to compressor stage gas, and because the use of filtered fuel allows the size of orifice 36 to be reduced, there is no need for the rate of change of pressure in the regulating pressure chamber 34 to be damped in order to prevent flame-out at the commencement of changing from the 'run' condition to that of 'idle'. Thus, in the illustrated embodiment all control can be accomplished by appropriate sizing of orifice 36, hence the substitution of the unrestricted outlet connection 66 in the selector valve 59 of FIG. 3. Such an arrangement provides for identical rates of acceleration and deceleration.

It will be understood that in the embodiment of FIG. 3 the volumetric capacity 37 in end cap 14 is in fact redundant so that a fuel flow control valve which is intended solely for use in a system utilising gas pressure from a compressor stage of an engine and fuel pressure from a fuel line as the fuel flow control parameters may dispense with the volumetric capacity 37 to enable a more compact and lighter weight valve to be used.

Such a valve representing a preferred embodiment of the invention is generally indicated at 60 in FIG. 4 in which like reference numerals are used to indicate parts similar to those previously described. The valve does not include a volumetric capacity 37 and has a modified second body portion 61 which again forms the regulating pressure chamber 34 and also becomes the end cap of the valve and carries the shroud 15. The orifice connection with the interior of the regulating pressure chamber 34 is provided during acceleration by an orifice 69 in the inlet connection 65 and during deceleration by an orifice 67 in the outlet connection 66 of solenoid controlled selector valve 59. The outlet connection 66 or vent side of the solenoid controlled selector valve 59 may be connected to tank 54 as shown in FIG. 3 or to the upstream side of the fuel pump 53.

It will be appreciated that the fuel flow control system of this invention, in operating by sensing pressure at a compressor stage only of a gas turbine (FIG. 2) or by sensing pressure at a compressor stage of a gas turbine and also fuel pressure delivering to the atomiser of the gas turbine (FIGS. 3 and 4) will automatically maintain a selected output condition in varying ambient conditions or in use of different grades of acceptable fuels.

Apart from providing optimum fuel flow for 'start-up', 'idle' and 'run' conditions of a gas turbine this invention provides automatic control of acceleration and deceleration rates to ensure safe and efficient operation.

Whilst several embodiments have been described and illustrated it will be understood that many modifications may be made without departing from the scope of the invention as defined in the appended claims. For example the needle valve arrangement may be replaced by any suitable valve means and the first pressure responsive member may comprise a bellows assembly. The respective rates of acceleration and deceleration can be adapted to a particular application by changing for example the respective sizes of the various orifices and/or the control chamber volumes. In the embodiment of FIG. 3 the described identical rates of acceleration and deceleration can be changed by introducing an orifice into either the inlet connection 65 or the outlet connection 66 or both connections of the control valve 59. Due to the higher density of the liquid pressure reference source used in the embodiment of FIG. 4 the diameter of the piston 35 can be reduced from that of the other embodiments to further reduce the size and weight of the unit.

What is claimed is:

1. A fuel flow control valve for controlling the flow of fuel to a twospeed gas turbine comprising in combination, a valve body, a fuel passageway in said valve body, a spindle valve slidably mounted in said valve body and movable to vary the fuel flow through said passageway, spring means housed in said valve body for urging said spindle valve towards a start up position within said passageway to permit a fuel flow therethrough, first and second variable volume fluid pressure chambers within said valve body, first pressure responsive means operatively connected to said spindle valve responsive to pressure within said first pressure chamber to overcome the force of said spring menas and move said spindle valve in a first direction to an idle position thereof to permit an increased fuel flow through said passageway and second pressure responsive means operatively connected to said spindle valve responsive to pressure within said second pressure chamber to move said spindle valve in the opposite direction to a run position thereof to permit a reduced fuel flow through said passageway.

2. A control valve according to claim 1 wherein said spindle valve includes a valve head carried by an axially movable spindle, a valve seat in said valve body, said valve head cooperating with said valve seat to control the flow through said passageway, said first pressure responsive means including a first movable wall of said first fluid pressure chamber, said second pressure responsive menas including a second movable wall of said second fluid pressure chamber, a flow restrictor in fluid communication with the second fluid pressure chamber, selector valve means selectively operable during operation to connect said second fluid pressure chamber to a supply of pressurized fluid or to a vent connection and adjustable stop means for limiting axial movement of said second pressure responsive means, said spring means being disposed between facing surfaces of said first and second movable walls and acting to urge said walls axially apart.

3. A control valve as claimed in claim 2, wherein said first pressure responsive means includes a diaphragm assembly.

4. A control valve as claimed in claim 2, wherein said second pressure responsive means includes a spring plate operatively associated with a piston.

5. A control valve as claimed in claim 4, and further including adjustable positioning means comprising a threaded end of said spindle protruding through an aperture in said spring plate and an adjuster nut on the protruding end retained in contact with the surface of the spring plate under the influence of said spring means when the valve is at rest.

6. A control valve as claimed in claim 4, wherein said adjustable stop means comprises at least two diametrically opposed fingers on the spring plate located in axial slots in said valve body and an adjustable threaded ring on said valve body at both sides of the plate to limit axial movement of the plate during operation.

7. A control valve as claimed in claim 2 and including a third fluid pressure chamber interposed between said selector valve means and said second fluid pressure chamber, said flow restrictor being located between said second and third chambers.

8. A control valve as claimed in claim 2, wherein said valve head comprises a needle valve.

* * * * *